US011412867B2

(12) United States Patent
Saavedra et al.

(10) Patent No.: US 11,412,867 B2
(45) Date of Patent: Aug. 16, 2022

(54) SENSOR-ACTUATED MASK-ENHANCED DIGITAL VIDEO FRAME

(71) Applicant: Infinite Objects, Inc., Brooklyn, NY (US)

(72) Inventors: Joseph Saavedra, New York, NY (US); Kensuke Sembo, New York, NY (US); Nicholas Dangerfield, New York, NY (US); Alexander Chung, New York, NY (US); Ralph Bishop, New York, NY (US)

(73) Assignee: INFINITE OBJECTS, INC., Brooklyn, NY (US)

( * ) Notice: Subject to any disclaimer, the term of this patent is extended or adjusted under 35 U.S.C. 154(b) by 0 days.

(21) Appl. No.: 17/381,884

(22) Filed: Jul. 21, 2021

(65) Prior Publication Data
US 2021/0357167 A1 Nov. 18, 2021

Related U.S. Application Data

(63) Continuation of application No. 17/024,942, filed on Sep. 18, 2020, now Pat. No. 11,317,742.
(Continued)

(51) Int. Cl.
*A47G 1/06* (2006.01)
*G06F 3/147* (2006.01)
(Continued)

(52) U.S. Cl.
CPC ............... *A47G 1/06* (2013.01); *A47G 1/065* (2013.01); *A47G 1/0622* (2013.01);
(Continued)

(58) Field of Classification Search
CPC .......... G09G 2380/16; G09G 2300/023; G06F 1/1601; G06F 1/1603; G02F 1/133308; H04M 1/0266
(Continued)

(56) References Cited

U.S. PATENT DOCUMENTS 5,999,445 A * 12/1999 Rolandi ............... G11C 11/5621
365/185.03
6,975,308 B1 * 12/2005 Bitetto ............... H04N 1/00294
345/104
(Continued)

FOREIGN PATENT DOCUMENTS

GB 2422211 7/2006
KR 200307072 4/2003
WO WO 2019/158900 8/2019

OTHER PUBLICATIONS

No Author. "Source Jewelry Presentation Digital Greeting Lcd Display Gift IPS Screen 7 Inch Video Card Box." Mibaba.com. https://m.alibaba.com/product/60799299364/Jewelry-Presentation-Digital-Greeting-Lcd-Display.html. Published on or before Sep. 2, 2021. 15 pages.
(Continued)

*Primary Examiner* — Koosha Sharifi-Tafreshi
(74) *Attorney, Agent, or Firm* — Leason Ellis LLP

(57) ABSTRACT

A framed collectible for displaying a continuously-looping playback of a digital video file is provided, wherein a display panel is controlled by a display controller to play at least one video file in a continuous loop on the display panel only while an output signal from a magnet sensor indicates no proximity to a magnet proximal to the back side of the display panel. The display controller has a printed circuit board that incorporates at least one processor and at least one memory that contains at least one video file. The memory, which in an embodiment can be flash memory, is factory programmed and therefore the memory content cannot be changed by an end user. Packaging for storage and shipping of the framed collectible is also provided, which incorporates a magnet that is sensed by the magnet sensor to keep continuously-looping video playback switched off while the device is stored.

30 Claims, 9 Drawing Sheets

Related U.S. Application Data

(60) Provisional application No. 62/902,197, filed on Sep. 18, 2019.

(51) Int. Cl.
*H04N 1/00* (2006.01)
*G02F 1/1333* (2006.01)
*G09F 9/00* (2006.01)

(52) U.S. Cl.
CPC ........ *G02F 1/133308* (2013.01); *G06F 3/147* (2013.01); *G09F 9/00* (2013.01); *H04N 1/00124* (2013.01); *H04N 1/00289* (2013.01); *G09G 2380/16* (2013.01); *H04N 2201/3267* (2013.01)

(58) Field of Classification Search
USPC .............. 361/679.21, 679.22, 679.26, 679.3; 349/58
See application file for complete search history.

(56) References Cited

U.S. PATENT DOCUMENTS

| | | | | |
|---|---|---|---|---|
| 2008/0068356 | A1* | 3/2008 | Zavoronkovs | A47G 19/025 345/204 |
| 2008/0247127 | A1* | 10/2008 | Finnegan | H05K 5/0217 361/679.02 |
| 2009/0219245 | A1* | 9/2009 | Frankel | H04N 1/0035 345/104 |
| 2013/0233841 | A1* | 9/2013 | Gallo | H05B 1/00 219/201 |
| 2014/0084854 | A1* | 3/2014 | Eifuku | H01M 10/44 320/107 |
| 2016/0163268 | A1 | 6/2016 | Yoo et al. | |
| 2016/0284310 | A1* | 9/2016 | Okita | G09G 5/006 |
| 2016/0352877 | A1* | 12/2016 | Chen | G06F 1/1626 |
| 2017/0032819 | A1 | 2/2017 | Sevilla-Lara et al. | |
| 2019/0001637 | A1* | 1/2019 | Ito | B32B 27/08 |
| 2020/0241825 | A1* | 7/2020 | Miller | H04L 67/02 |

OTHER PUBLICATIONS

No Author. "Source Promotional advertising video brochure lcd video gift cards digital tft screen invitation lcd video greeting card for marketing." Alibaba.com. https://m.alibaba.com/product/60104583004/Promotional-advertising-video-brochure-lcd-video.html?_detailProductImg=https%3A%2F%2Fs.alicdn.com%2F%40sc04%2Fkf%2FHTB1yDMMmlnTBKNjSZPfq6zf1XXa0.jpg_200x200.jpg. Published on or before Jan. 24, 2018. 8 pages.

No Author. "Factory Promotional Lcd Hd Ips Screen Digital Video Brochure For Business—Buy Video Brochure, Video Brochure For Business,Digital Video Brochure Product" Alibaba.com. https://www.alibaba.com/product-detail/Video-Brochure-Video-Brochure-Factory-Promotional_62424206825.html?spm=a2700.galleryofferlist.normal_offer.d_title.37b4d7e2xueqeZ&s=p. Published on or before Dec. 4, 2019. 13 pages.

* cited by examiner

SENSOR-ACTUATED MASK-ENHANCED DIGITAL VIDEO FRAME

CROSS-REFERENCE TO RELATED APPLICATIONS

The present invention is a continuation of U.S. Non-Provisional Patent Application Ser. No. 17/024,942, having the same title, filed Sep. 18, 2020, which claims priority to U.S. Provisional Patent Application Ser. No. 62/902,197, having the same title, filed Sep. 18, 2019, which is incorporated by reference herein in its entirety.

FIELD OF THE DISCLOSURE

This patent application generally relates to framed collectibles that display the contents of one or more video files. More particularly, the present disclosure provides a framed collectible having a memory that is programmed once with digital video content at the factory or other pre-consumer/end user location, and a power switch system that switches the device power on, playing the video content on a continuous loop, when the collectible is initially removed from its packaging. The enclosure of the framed collectible also incorporates an intermediary mask layer, or overlay, that can be made of a material and cut to a pattern that is can be designed to display certain portions or attributes of the content on the display panel underneath. The pattern to which the intermediary mask layer is cut effectively creates active and inactive areas of the display panel of the framed collectible, and the choice of material used to form the intermediary mask layer can have a degree of translucency that adds texture to the active pixels of the display panel. As described below, the intermediary mask layer is part of the artwork.

BACKGROUND OF THE DISCLOSURE

Framed collectibles, picture frames, and other personal photographic mementos have been around to provide enjoyment and warm reminiscences for a long time. Since the advent of conventional photography using light-sensitive films in the nineteenth century, the desire to visibly and prominently display photographs that were of aesthetic, historical, or personal significance has led to the use of picture frames to display the photographs, which previously had been used to display works of art or prints thereof. In the past, these were static images which, once mounted in the frame, required a manual process to change the photograph being displayed. The appearance of digital cameras and digital picture frames in the 1990s allowed some flexibility in the selection of pictures to display, as a user of the digital frame could load an array of digital photos or conventional photographs converted to digital format, into the digital frame, limited only by the storage capacity of the digital frame. These standard digital picture frames were limited in that the images displayed were static, and the active display of the images involves the use of a manual power switch.

SUMMARY OF THE DISCLOSURE

The present disclosure provides a framed collectible that is a vast advance in capability over the digital frames of the past. It offers a framed collectible comprising a frame-enclosed display assembly having a mask-enhanced display panel and display controller, wherein the display controller includes a processor and a memory and operates to play video clips in a continuous loop when actuated by a sensor integral to the frame. Embodiments of the disclosure provide sensors including magnet sensors, ambient light sensors, and motions sensors. The packaging of the frame-enclosed display assembly can include a magnet which, when sensed by a magnet sensor integral to the framed collectible, keeps the framed collectible from performing continuous-loop video playback while it is in the package for storage or shipment. The memory is programmed only once at the factory, and in an embodiment can take the form of flash memory. This feature makes it possible to create editions of the digital data stored in memory on the device. The intermediary mask layer or overlay is manufactured in a pattern that covers a portion of the front side of the display panel in the range of 0% to 100%, and it is retained in place against the front side of the display panel by a front plate that has a clear lens. The intermediary mask layer can be made of a translucent material to permanently add texture to the active pixels of the display panel, or it can be cut to create active parts of the display panel as well as non-active parts of the display, wherein the intermediary mask layer partially or fully obstructs parts of the active pixel area.

In another aspect, an exemplary method of forming an intermediary mask layer for use in a framed collectible includes the steps of:

obtaining source digital video content to be used in a framed collectible;

providing the source digital video content as an input to a software module that analyzes video content to determine parametric functions of the video content, including but not limited to video content focal points, video content densities, and video content velocities as functions of time;

guided by the parametric functions of the source digital video content, fabricating the intermediary mask layer to produce a pattern that will enhance or highlight the source digital video content when played back on a display panel of the framed collectible.

The source digital video content is provided as an input to a software module that analyzes video content to determine parametric functions of the video content, including but not limited to video content focal points, video content densities, and video content velocities as functions of time. It is envisioned that exemplary parametric functions can include, but are not limited to, outline/shape detection, face detection and/or body silhouette recognition.

BRIEF DESCRIPTION OF THE DRAWINGS

The accompanying drawing figures illustrate exemplary embodiments and are not intended to be limiting of the present disclosure. Among the drawing figures, like references are intended to refer to like or corresponding parts.

DETAILED DESCRIPTION OF CERTAIN EMBODIMENTS ACCORDING TO THE DISCLOSURE

The present disclosure concerns a framed collectible for the home or office that incorporates a memory, such as a flash memory, to permanently capture images or video for replay within the framed collectible.

As a further advantage, the framed collectible described herein is shipped in packaging that advantageously keeps the battery in an OFF state while the package is stored or in transit to its ultimate destination, the user/buyer. This is accomplished by means of a sensor-actuated power cutoff that keeps the battery circuit open while the framed collectible is still in the stream of commerce. Once the user opens the package and removes the framed collectible, the battery assumes an ON state and power is delivered to the frame collectible resulting in the display thereof being powered on.

Figure 1:
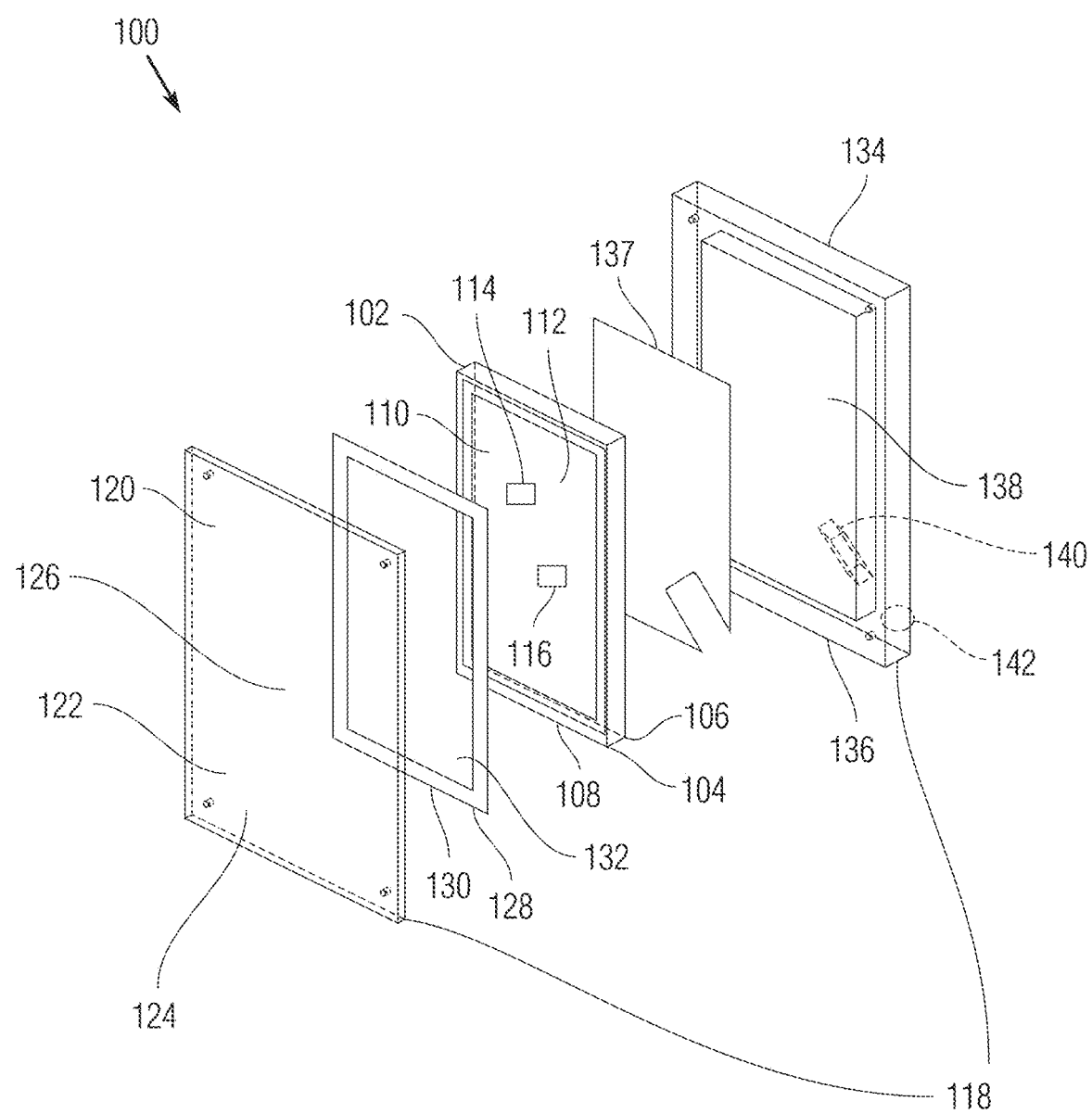
FIG. 1 illustrates a perspective exploded view of an embodiment of a framed collectible of the present disclosure, shown prior to assembly.

Referring to FIG. 1, the framed collectible 100 of one implementation of the present disclosure is shown in an exploded view, prior to assembly into the finished product. The core of the framed collectible 100 is the display assembly 102, which has a front end 104 and a back end 106. A display panel 108 integral to the display assembly 102 is proximal to its front end 104 and incorporates a front side 110 for displaying a digital video image and a back side 112. Suitable display panels include but are not limited to thin-film-transistor liquid-crystal displays (TFT LCD), organic light-emitting diode (OLED) displays, and electronic paper displays. A display controller 114 is electrically connected to the display panel 108 and situated proximally to the display panel's back side 112. The display controller 114 comprises a printed circuit board having at least one processor and at least one memory that contains at least one video file. The memory is factory programmed, with the result that the content of the memory cannot be changed by an end user of the framed collectible 100. In an embodiment of the invention, the memory is a flash memory. In other words, the memory is a factory programmed memory and the player of the present invention does not have a data port to allow the user to write to the memory. The user can only simply play the media. Thus, the consumer has no access right (since there are no data ports or the like) and instead, the memory is factory programmed. In one embodiment, the memory can be of a WORM type (write once, read many), which refers to data storage media that can be written to once, but read multiple times or alternatively it can comprise some form of solid state read-only memory (ROM) originally programmed by a manufacturer. It will be appreciated that other types of memory can be used so long as the end user does not have access rights to the memory and thus cannot alter the content of the memory.

The processor controls the display panel 108 to play the at least one video file in a continuous loop on the display panel.

The display controller 114 can also electrically connected to a magnet sensor 116 located within the display assembly 102, proximal to its back end 106. The magnet sensor 116 generates an output signal that indicates proximity or lack of proximity to a magnet, for, as described herein, controlling the powering up of the framed collectible 100. The display controller 114 uses the magnet sensor 116 output signal to determine when to trigger continuously-looping video playback. As described herein, the initial storage/transportation setting is an off-setting in which no power is provided. Specifically, when the output signal of the magnet sensor 116 indicates no proximity to a magnet, the display controller 114 switches on the continuously-looping video playback. Alternative arrangements for a sensor configured to trigger the display controller 114 to perform continuously-looping digital video playback include various types of environment sensors that trigger playback in response to a sensed event in the framed collectible's environment. Examples of environment sensors include but are not limited to ambient light sensors and motion sensors. These types of sensors can be used to both initially activate and control subsequent actuation of the frame collectible 100 after removal from its packaging.

The display assembly is then surrounded by elements of a frame 118 which, when engaged and sealed, form the functional enclosure that is the framed collectible of the present disclosure. The frame 118 consists of a front plate 120 proximal to the front end 104 of the display assembly 102, which has a front side 122, a back side 124, and a clear lens 126. The front plate can be made of clear plastic or acrylic. The frame 118 also incorporates an intermediary mask layer 128 having a front side 130 and a back side 132, wherein the edges of the intermediary mask layer 128 describe a pattern that covers a portion of the front side 110 of the display panel 108. The portion of the display panel's front side 110 that the intermediary mask layer 128 is patterned to cover can be in the range of 0% to 100%. The intermediary mask layer can be made of an opaque or a translucent material, possible materials including but not limited to paper, plastic, metal, and wood. The front side of the intermediary mask layer 128 can be decorated with coloring or a custom print, and it can include voids that create a custom pattern. The back side 132 of the intermediary mask layer 128 is retained in place against the front side 110 of the display panel 108 by the back side 124 of the front plate 120. A back plate 134 has a front side 136 and a back side 138 and is proximal to the back end 106 of the display assembly 102. The back plate 134 can be made of materials including but not limited to clear plastic or acrylic, wood, cardboard, and opaque plastic, and the back plate can be decorated with coloring or a custom print 137 to enhance the visual effect of the continuously-looping digital video. A battery compartment 140 is provided integral to the frame 118 and electrically connected to the display controller 114 and to an external charging/AC power port 142 (e.g., a USB port or the like) integral to the frame 118. In one embodiment, the battery compartment 140 is not accessible to the end user but rather comprises a concealed compartment.

The framed collectible is then assembled by engaging the parts as follows, listed in order from front to back: the front plate 120, the intermediary mask layer 128, the display assembly 102, and the back plate 134, and then sealing the assembled framed collectible 100 to form an enclosure. The framed collectible enclosure can optionally be placed in an external decorative frame (not shown), such as a picture frame, surrounding the frame 118 of the framed collectible 100. The external decorative frame can be made of materials including wood, plastic, or metal. The present disclosure also provides a stand (not shown) to hold the external decorative frame firmly in place at a specific angle, wherein the stand can include inductive changing circuitry to power the framed collectible 100 when the external decorative frame is seated in the stand. Alternatively, other means for displaying the frame collectible are possible, such as hanging the frame collectible on a wall. The rear face can thus have a recess or whole that can receive a fastener, such as a hook, that is inserted into the wall.

Figure 2:
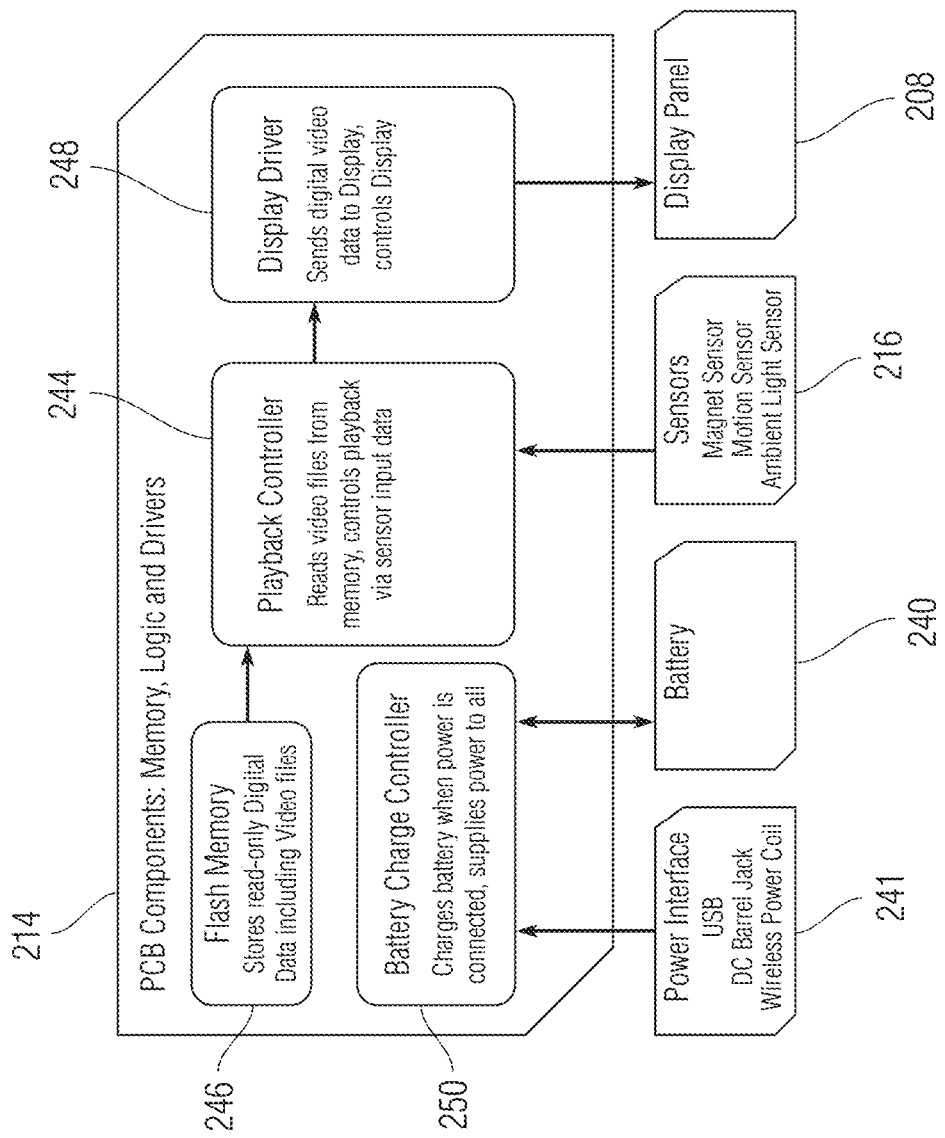
FIG. 2 illustrates a schematic view of an embodiment of the framed collectible's display controller of the present disclosure.

Referring now to FIG. 2, an embodiment of the display controller 214 is shown, wherein the display controller incorporates a playback controller 244 configured to read video data from the at least one video file in the at least one memory 246. As described herein and according to one implementation, the playback controller 244 reads the video data when the output signal of the magnet sensor 216 indicates no proximity to a magnet. The display controller also incorporates a display driver 248 configured to receive video data from the playback controller 244 and transmit the video data to the display panel 208, along with commands to control a display panel backlight. A further aspect of an embodiment of the display controller 214 is the inclusion of a battery charge controller 250, which is electrically connected to the battery compartment 240 and to the other components of the display controller 214. The battery charge controller 250 charges the battery when an external power source is connected, and supplies power to all components of the display controller 214 as well as components that are electrically connected to components of the display controller 214. The frame collectible 100 is initially charged when placed in its packaging so that during storage it maintains a charge and after the initial reveal, the framed collectible 100 stays powered for quite some time depending upon the type of batteries. For example, the framed collectible can be powered on continuously for at least 1 hour and preferably 2 or more hours. Since the content of the framed collectible 100 is fixed, when the frame collectible 100 is powered up, the power source powers the continuous looping of the stored one or more videos.

Figure 3:
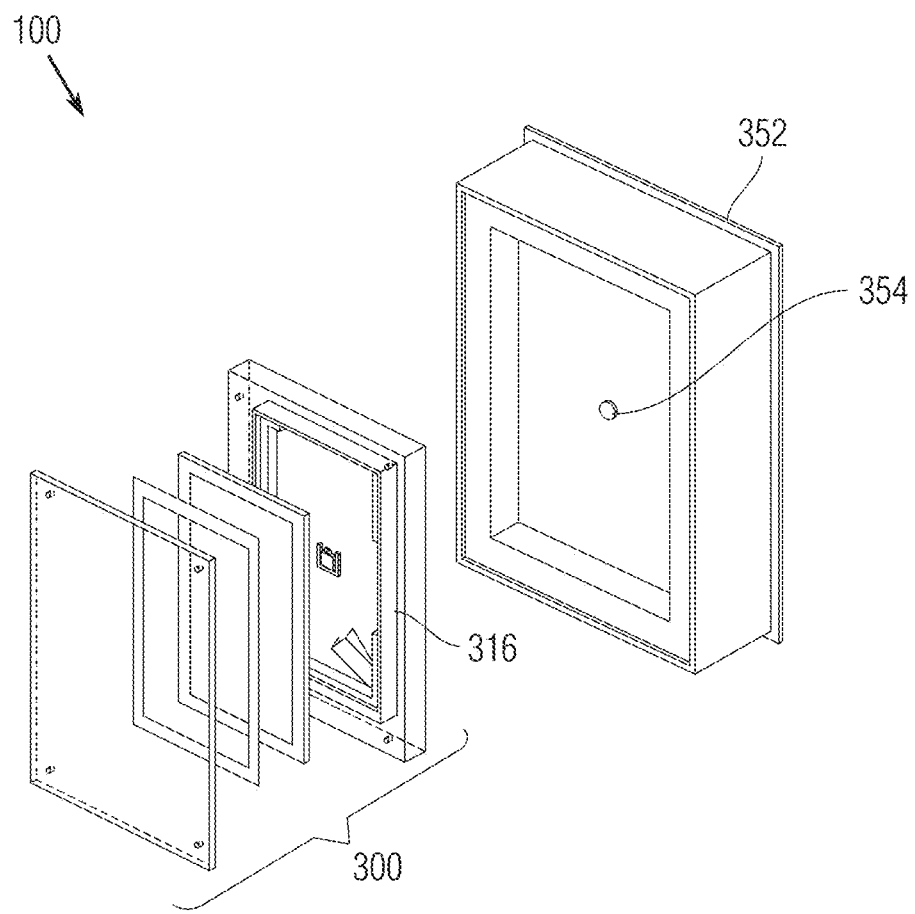
FIG. 3 illustrates a further perspective exploded view of an embodiment of the framed collectible according to the present disclosure, shown with an embodiment of the packaging of the present disclosure.

FIG. 3 shows a further aspect of the present disclosure, wherein packaging 352 is provided that is designed to prevent operation of the framed collectible 300 when it is not being displayed such as during storage and/or transportation. The packaging 352 protects the framed collectible 300 during storage and shipping, and the packaging 352 comprises a magnet 354 that aligns in proximity with the magnet sensor 316 of the framed collectible 300 when the framed collectible is properly and fully inserted into the packaging 352, resulting in a magnet sensor output signal that causes the display controller to switch power to off, ceasing video playback. Thus, after the collectible 100 is charged, the collectible 100 is placed into the packaging 352 which can be in the form of a box or the like that has a recessed area for holding the packaging 352. The magnet 354 lies within this recessed space. As mentioned, the positioning of the magnet 354 within the packaging 352 is made in view of the location of the magnet sensor 316 on the collectible 100 since when the framed collectible 100 is placed within the packaging 352, the magnet 354 and magnet sensor 316 align or are in close proximity since this is the means by which the frame collectible 100 is powered down. As mentioned, the frame collectible 100 has no user interface and therefore has no control buttons such as an on/off switch or button according to one implementation. The only user interaction with the collectible 100 is the powering operation in which a power cord can be plugged into the external charging/AC power port 142.

Figure 7:
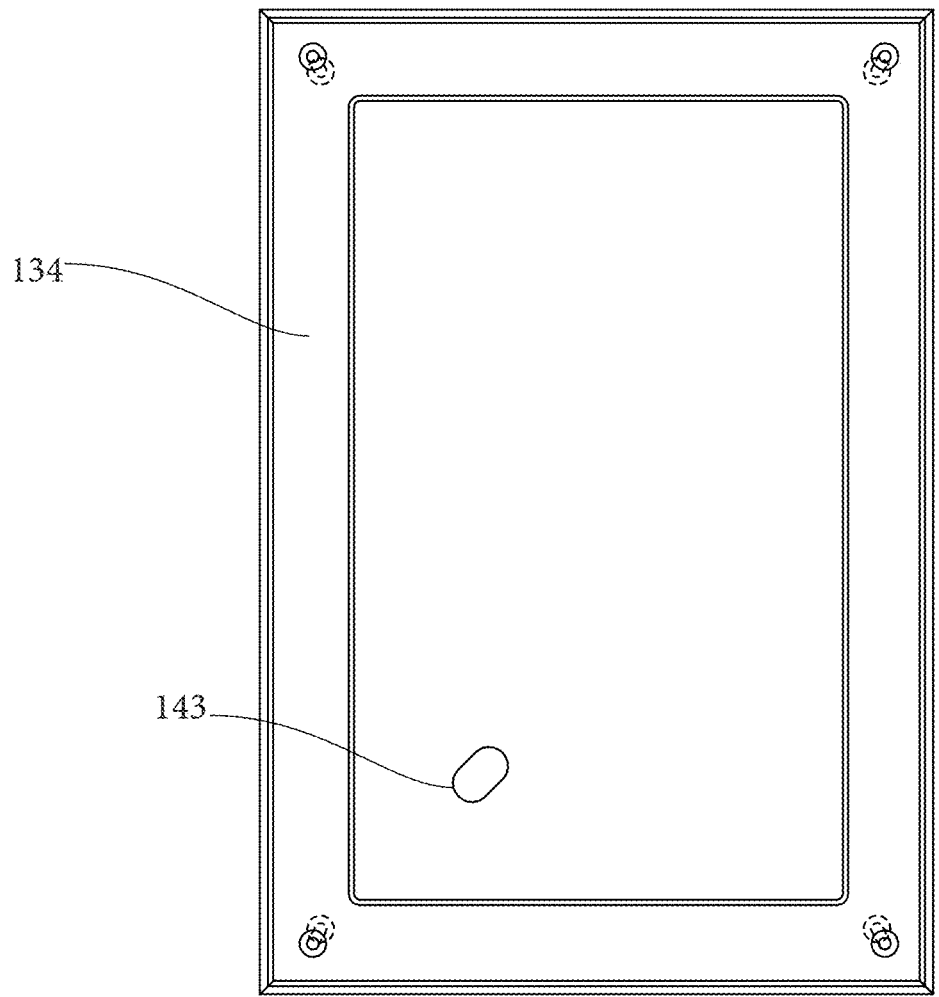
FIG. 7 is front elevation view of a back plate of the framed collectible according to an embodiment of the present disclosure.
Figure 8:
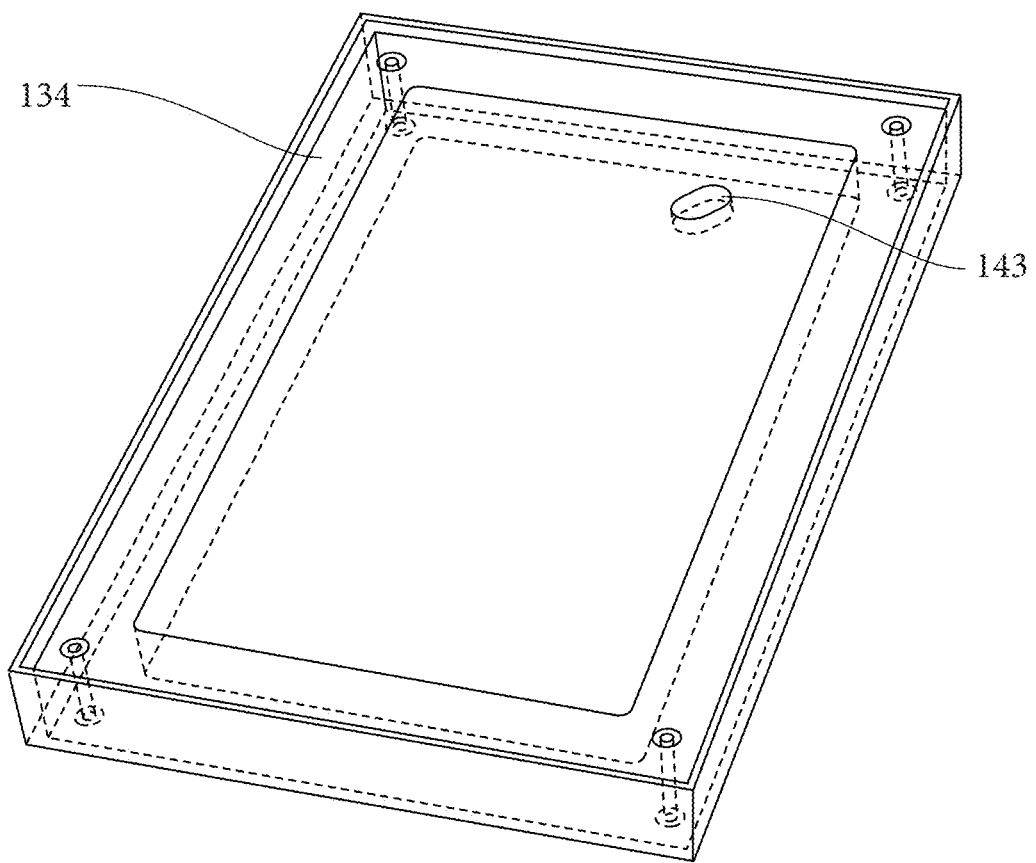
FIG. 8 is a perspective view of the back plate of the frame collectible according to an embodiment of the present disclosure.
Figure 9:
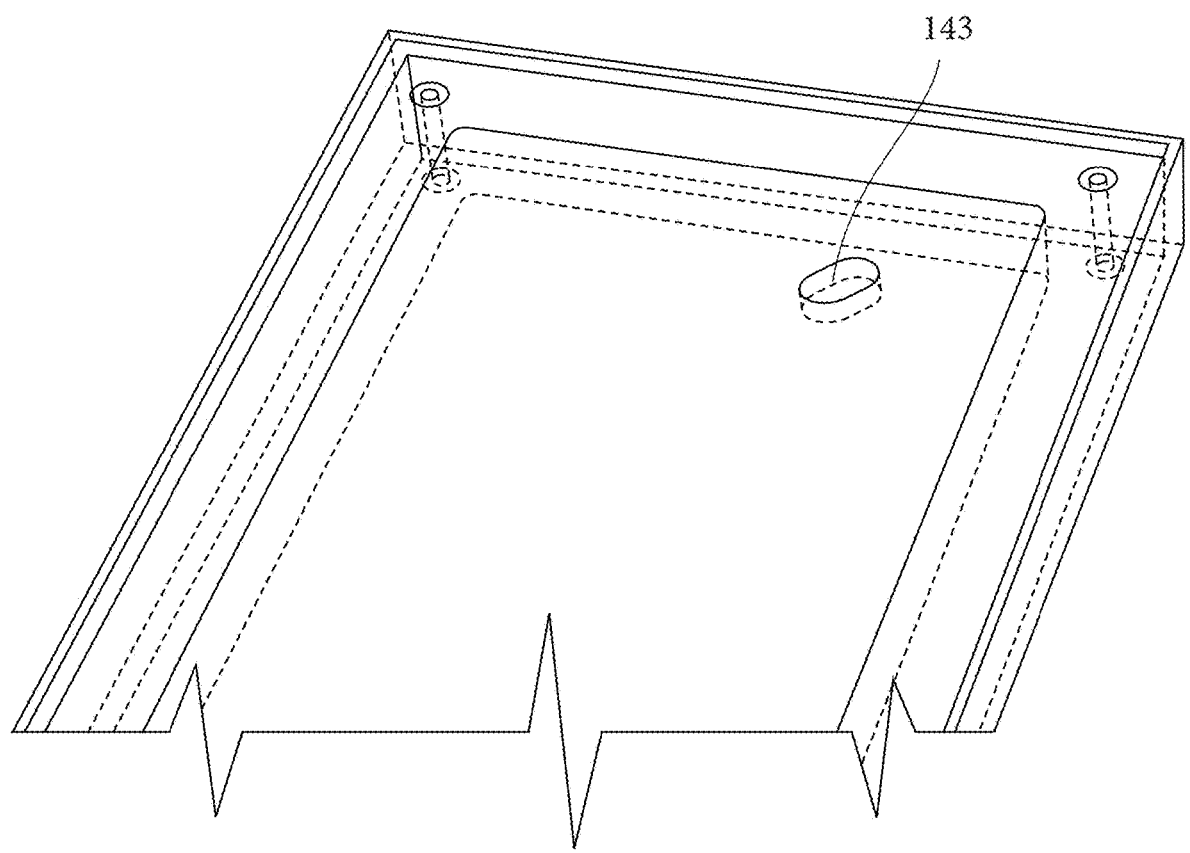
FIG. 9 is an enlarged view of a top portion of the perspective view shown in FIG. 8.

FIGS. 7, 8, and 9 are views of an exemplary frame 118 that indicate an exemplary configuration and placement of an external charging/AC power port 143. As shown, the external charging/AC power port can be configured as an oval or oblong opening positioned toward on corner of the back plate 134 of the framed collectible 100. The external charging/AC power port 143 can comprise a USB or another other appropriate standard coupling for receiving electrical power from a corresponding USB or other connector.

One aspect of the framed collectible 100 is that once the consumer (end user) removes the framed collectible 100 from the packaging 352, the framed collection 100 comes to life and awakes from its dark, off state and the fixed content (one or more videos) begins playing. This action reveals the content of the framed collectible 100 since the user initially only sees a static, often black screen before the framed collectible 100 is lifted from the packaging.

The present disclosure also provides a method of forming an intermediary mask layer 128 to be used in a framed collectible 100, wherein the method begins when a user obtains source digital video content to be used in the framed collectible. The user then provides the source digital video content as an input to a software module that analyzes video content to determine parametric functions of the video content, including but not limited to video content focal points, video content densities, and video content velocities as functions of time. Guided by the parametric functions of the source digital video content, the intermediary mask layer 128 is then fabricated to produce a pattern that will enhance or highlight the source digital video content when played back on a display screen of the framed collectible. The processes used to fabricate the intermediary mask layer include but are not limited to die-cutting, etching, and printing.

Figure 4:
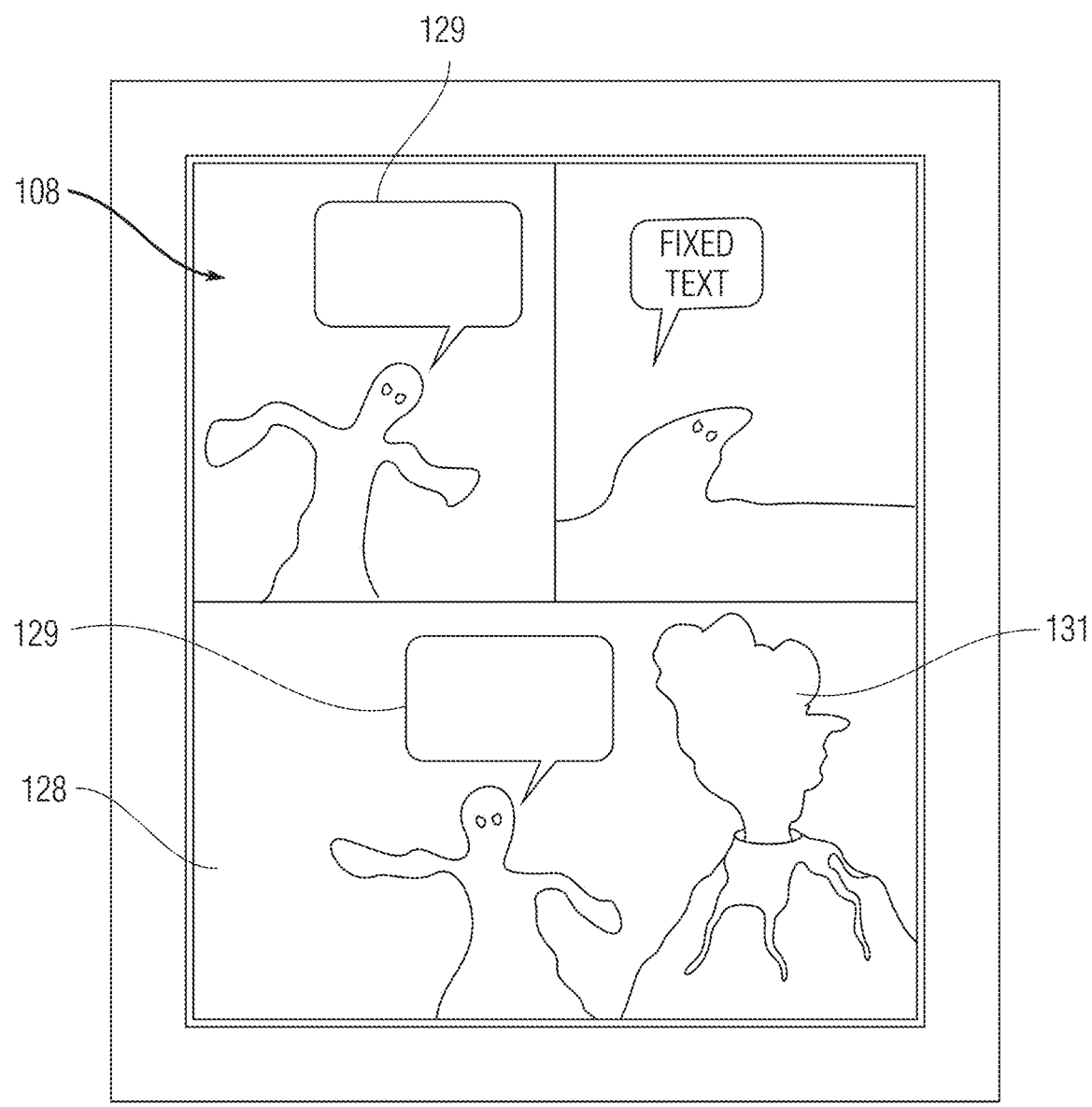
FIG. 4 is front elevation view of one exemplary framed collectible.
Figure 5:
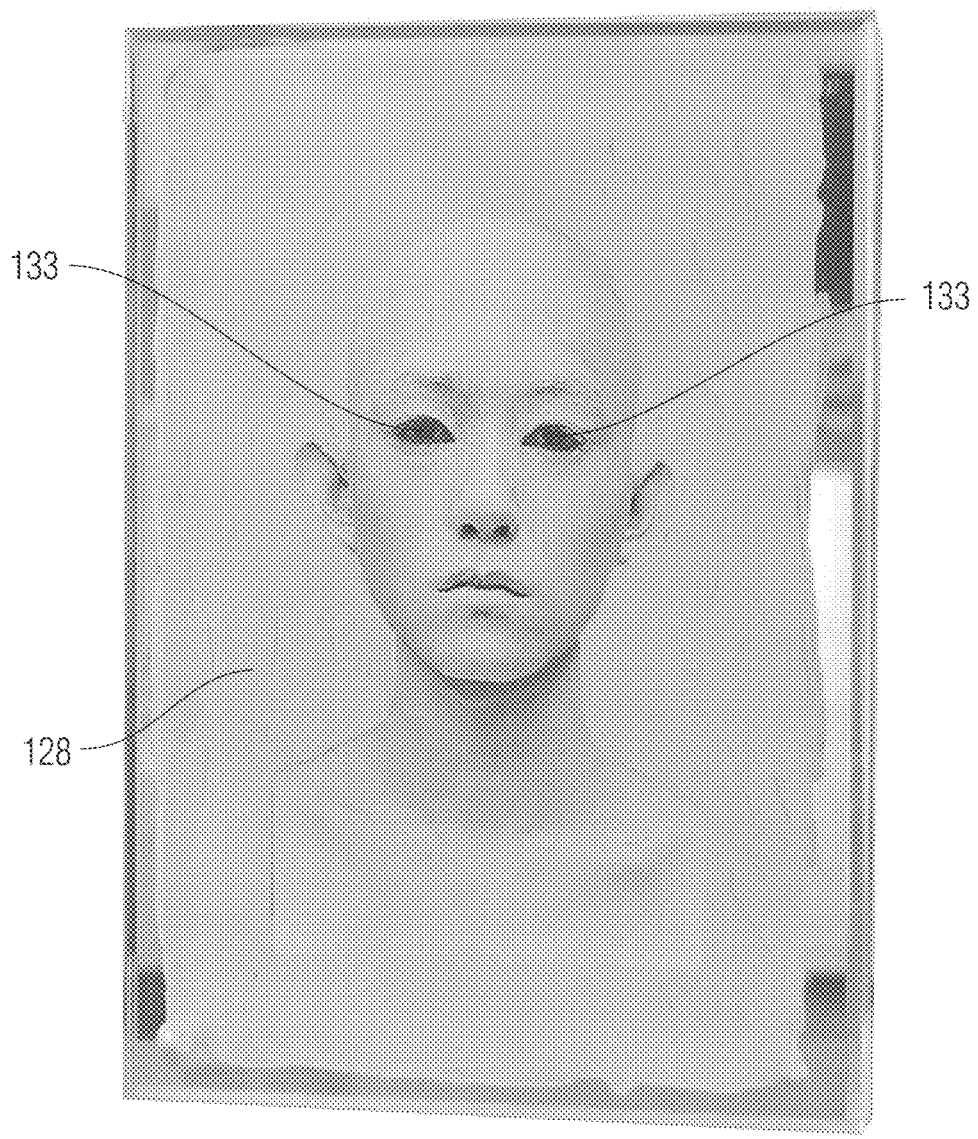
FIG. 5 is a photograph showing a front elevation view of one exemplary framed collectible.
Figure 6:
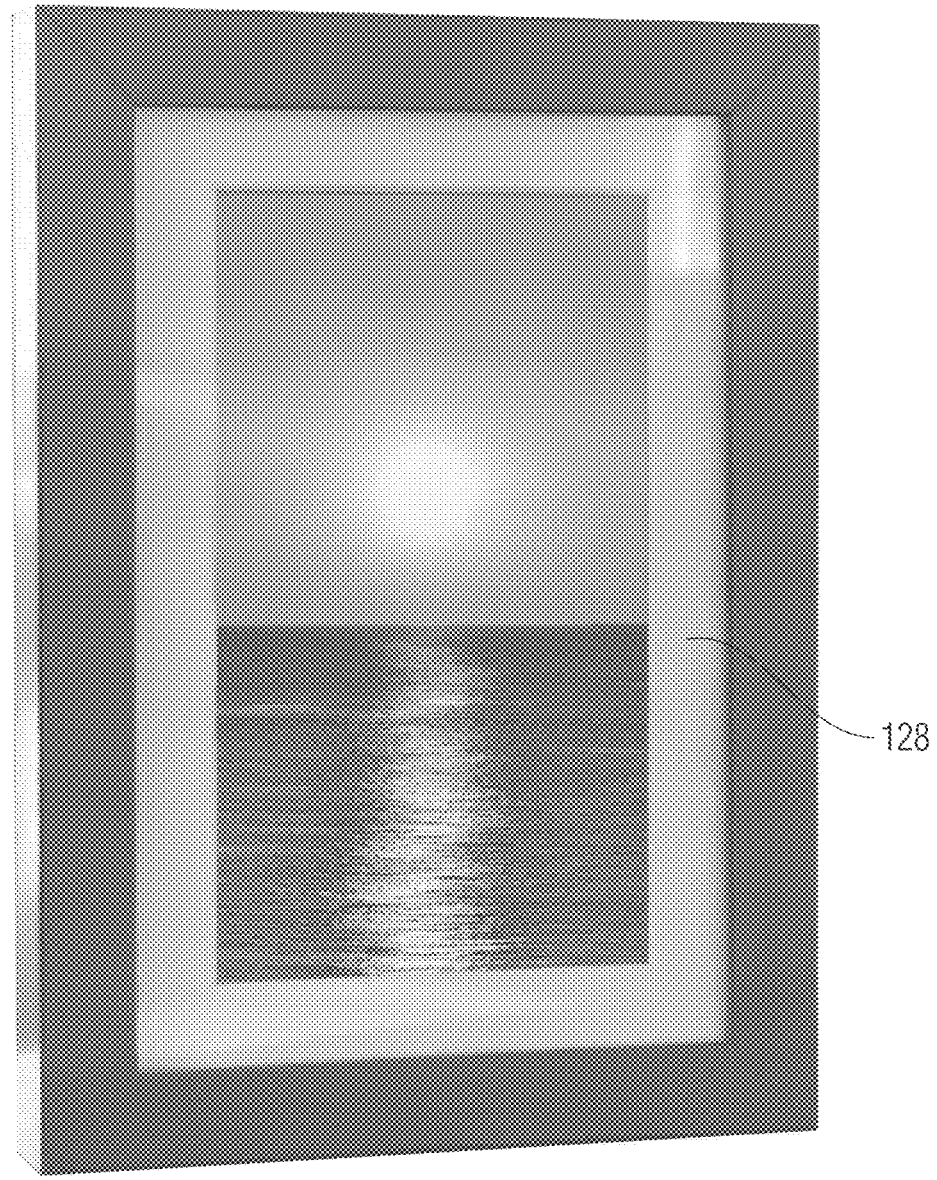
FIG. 6 is a photograph showing front elevation view of another exemplary framed collectible.

FIGS. 4 to 6 show different framed collectibles with different exemplary intermediate masks layers 128. FIG. 4 shows a frame collectible that is geared towards a cartoon lover in that the intermediate mask layer 128 comprises a cartoon strip within one or more areas of the cartoon strip being removed from the intermediate mask layer 128, thereby creating direct access to the underlying display panel 108. These open areas within the mask layer 128 are in registration with active areas of the underlying display panel 108 and therefore, any video content displayed in these active areas of the display panel 108 are visible through the open areas of the mask layer 128. For example, one or more bubbles 129 above one or more sections of the cartoon can be interactive in that the bubble comprises a cut out in the intermediate mask layer 128 and fixed (looping) video content is displayed. This fixed video content can be in the form of text (words) and/or graphics. When in the form of a series of words, the words can be displayed successively within the bubble in a continuous looping manner. The cartoon strip can also include another opening 131 formed through the mask layer 128 through which video content in an active region of the display panel 108 is displayed. For example, as shown, spewing lava can be shown in looped video formed in the opening 131, while the volcano base is formed as fixed content of the mask layer 128 (e.g., printed or painted matter, etc.).

FIG. 5 shows another example in which the intermediate mask layer 128 is formed of an opaque material is formed to resemble a face with the eyes 133 being cutouts formed in the intermediate mask layer 128, thereby creating direct access to the underlying display panel 108. These open areas within the mask layer 128 are in registration with active areas of the underlying display panel 108 and therefore, any video content displayed in these active areas of the display panel 108 are visible through the open areas of the mask layer 128. Since these areas represent the eyes of the face, the video content can be in the form of continuously blinking eyes and/or video content depicting eye movement in a continuous looping manner. Since the intermediate mask layer 128 is opaque, the dynamic content of this framed collectible 100 can be carefully tailored to one or more target areas, such as the entire silhouette of the head or to only thee eye areas. Areas that surround these dynamic areas are represented by the static area of the mask layer 128.

Based on the foregoing, it will be appreciated that the display panel 108 can be considered to have active areas (regions/pixels) and non-active areas. The one or more videos stored in memory are thus only displayed within the active areas and the non-active areas are blank (no video is displayed). The non-active areas can be covered with the intermediate mask layer 128. However, the active areas must be at least partially in registration with the open areas of the mask layer 128 so as to allow the video content to be seen. For any given collectible 100, plural discrete active areas can be provided within the display panel 108. For example, in the cartoon example of FIG. 4, more than one cartoon bubble can be dynamic and represented by active areas of the display panel for display content, such as graphics and/or text.

It will also be appreciated that the intermediate mask layer 128 can simply be a decorative border that surrounds the display panel 108 as shown in FIG. 6 or in another implementation, the mask layer 128 can be transparent, semi-transparent or translucent and covers the entire display panel 108 (e.g., a rice paper disposed over the entire display panel 108). This provides not only an aesthetic feature to the framed collectible 100 but also adds a tactile feature as well.

It will be appreciated that there is a vast amount of fixed content that can be placed on the intermediate mask layer 128, such as decorative designs, texts, graphics, etc. The mask layer 128 can be personalized relative to the stored video content. For example if the video comprises a video clip of a sports event, then the personalized content that can be part of the mask layer 128 can be a name of the sports team and/or identifying information, such as the date of the event, the player's name, the location of the event, etc. Similarly, if the video clip is a sunset at a favorite location of the end user (See, FIG. 6), such as a family cottage or the like, the information on the mask layer 128 can include the location of the family cottage, etc. and can include other graphics such as seashells, etc. in the event of a sunset over water, etc.

The invention encompassed by the present disclosure has been described with reference to the accompanying drawings, which form a part hereof, and which show, by way of illustration, example implementations and/or embodiments. As such, the figures and examples above are not meant to limit the scope of the present application to a single implementation, as other implementations are possible by way of interchange of some or all of the described or illustrated elements, without departing from the spirit of the present disclosure. Among other things, for example, the disclosed subject matter can be embodied as methods, devices, components, or systems.

Moreover, where certain elements of the present application can be partially or fully implemented using known components, only those portions of such known components that are necessary for an understanding of the present application are described, and detailed descriptions of other portions of such known components are omitted so as not to obscure the application. In the present specification, an implementation showing a singular component should not necessarily be limited to other implementations including a plurality of the same component, and vice-versa, unless explicitly stated otherwise herein. Moreover, applicants do not intend for any term in the specification or claims to be ascribed an uncommon or special meaning unless explicitly set forth as such. Further, the present application encompasses present and future known equivalents to the known components referred to herein by way of illustration.

Furthermore, it is recognized that terms used herein can have nuanced meanings that are suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter can be based upon combinations of individual example embodiments, or combinations of parts of individual example embodiments.

The foregoing description of the specific implementations will so fully reveal the general nature of the application that others can, by applying knowledge within the skill of the relevant art(s) (including the contents of the documents cited and incorporated by reference herein), readily modify and/or adapt for various applications such specific implementations, without undue experimentation, without departing from the general concept of the present application. Such adaptations and modifications are therefore intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s). It is to be understood that dimensions discussed or shown of drawings are shown accordingly to one example and other dimensions can be used without departing from the present disclosure.

While various implementations of the present application have been described above, it should be understood that they have been presented by way of example, and not limitation. It would be apparent to one skilled in the relevant art(s) that various changes in form and detail could be made therein without departing from the spirit and scope of the disclosure. Thus, the present disclosure should not be limited by any of the above-described example implementations, and the invention is to be understood as being defined by the recitations in the claims which follow and structural and functional equivalents of the features and steps in those recitations.

What is claimed:

1. A framed article for displaying a continuously-looping playback of a digital video file, the framed article comprising:
   a display assembly having a front end and a back end, comprising:
      a display panel proximal to the front end of the display assembly and comprising a front side for displaying a digital video image and a back side;
      a magnet sensor proximal to the back end of the display assembly;

a display controller proximal to the back side of the display panel and electrically connected to the display panel and the magnet sensor, the display controller comprising a printed circuit board having at least one processor and at least one memory that contains at least one video file, wherein the memory is factory programmed and therefore the content of the memory cannot be changed by an end user, and wherein the processor controls the display panel to play the at least one video file in a continuous loop on the display panel only while an output signal from the magnet sensor indicates no proximity to a magnet;

a frame comprising:
  a front plate proximal to the front end of the display assembly and comprising a front side, a back side, and a clear lens;
  an intermediary mask layer comprising a front side and a back side and patterned to cover a portion of the front side of the display panel, the portion in the range of 0% to 100%, wherein the back side of the intermediary mask layer is retained in place against the front side of the display panel by the back side of the front plate;
  a back plate proximal to the back end of the display assembly and comprising a front side and a back side; and
a battery compartment integral to the frame and electrically connected to the display controller and to an external charging/AC power port integral to the frame, wherein the framed article is assembled by engaging the following, listed in order from front to back: the front plate, the intermediary mask layer, the display assembly, and the back plate, and then sealing the assembled framed article to form an enclosure.

2. The framed article as in claim 1, further comprising an environment sensor configured to trigger the display controller to initiate continuously-looping digital video playback in response to a sensed event in the framed article's environment.

3. The framed article as in claim 2, wherein the environment sensor is selected from the group consisting of: ambient light sensor and motion sensor.

4. The framed article as in claim 1, wherein the memory is flash memory.

5. The framed article as in claim 1, wherein the display panel is selected from the group consisting of: thin-film-transistor liquid-crystal display (TFT LCD), organic light-emitting diode (OLED), and electronic paper.

6. The framed article as in claim 1, wherein the display controller comprises a playback controller configured to read video data from the at least one video file in the at least one memory when the output signal of the magnet sensor indicates no proximity to a magnet; and
  a display driver configured to receive video data from the playback controller and transmit the video data to the display panel, along with commands to control a display panel backlight.

7. The framed article as in claim 1, wherein the display controller further comprises a battery charge controller, electrically connected to the battery compartment and to the other components of the display controller, and wherein the battery charge controller charges the battery when an external power source is connected, and supplies power to all components of the display controller and components that are electrically connected to components of the display controller.

8. The framed article as in claim 1, further comprising packaging to protect the framed article during storage and shipping, wherein the packaging comprises a magnet that aligns in proximity with the magnet sensor of the framed article when the framed article is properly and fully inserted into the packaging, resulting in a magnet sensor output signal that causes the display controller to switch power to off, ceasing video playback.

9. The framed article as in claim 1, further comprising an external decorative frame surrounding the frame of the framed article, the external decorative frame is made of a material selected from the group consisting of: wood, plastic, and metal.

10. The framed article as in claim 9, further comprising a stand to hold the external decorative frame firmly in place at a specific angle, wherein the stand can include inductive changing circuitry to power the framed article when the external decorative frame is seated in the stand.

11. The framed article as in claim 1, wherein the front side of the intermediary mask layer can be decorated with coloring or a custom print, and wherein the intermediary mask layer can include voids that create a custom pattern.

12. The framed article as in claim 1, wherein the intermediary mask layer can be made of an opaque or a translucent material and the intermediary mask layer is made of a material selected from the group consisting of: paper, metal and wood.

13. The framed article as in claim 1, wherein the front side of the back plate can be decorated with coloring or a custom print.

14. The framed article as in claim 1, wherein the back plate is made of a material selected from the group consisting of: clear plastic or acrylic, wood, cardboard, and opaque plastic.

15. A framed article for displaying a continuously-looping playback of at least one digital video file, the framed article comprising:
  a digital display assembly having: (a) a screen for displaying the at least one digital video file and (b) a display controller comprising a printed circuit board having at least one processor and at least one memory that contains the at least one digital video file, wherein the memory is factory programmed and therefore the content of the memory cannot be changed by an end user, the digital display assembly further comprising a sensor that is operatively connected to the display controller and is configured to sense a change in proximity between the framed article and an external object;
  a frame disposed in relation to the digital display assembly; and
  a power source operatively connected to the display controller;
  wherein the display controller is programmed to automatically initiate the continuously looping playback of the at least one digital video file in response to an output signal of the sensor that indicates the change in proximity between the framed article and the external object.

16. The framed article of claim 15, wherein the sensor is selected from the group consisting of: a magnet sensor, an ambient light sensor, and a motion sensor.

17. The framed article of claim 16, wherein the sensor comprises a magnet sensor configured to sense a presence of a magnet.

18. The framed article of claim 15, wherein the power source comprises a battery and the frame comprises a charging port for charging the battery.

19. The framed article of claim 15, wherein the framed article is free of any user accessible user interface that is configured to control operation and playback of the at least one digital video file.

20. The framed article of claim 15, wherein the frame comprises:
- a front plate disposed along a front side of the digital display assembly;
- an intermediary mask layer that is patterned to cover at least a portion of the screen, the portion in the range of 0% to 100%; and
- a back plate disposed along a back side of the digital display assembly.

21. The framed article of claim 20, wherein the intermediary mask layer is disposed against a front surface of the screen and includes at least one active area in which the screen is visible and at least one inactive area that covers and obscures the screen.

22. The framed article of claim 21, wherein the at least one active area is spaced inward from a peripheral edge of the screen and is completely surrounded by the at least one inactive area.

23. The framed article of claim 21, wherein the screen includes at least one active area defined by a first set of pixels and at least one inactive area defined by a second set of pixels, wherein the at least one digital video file is displayed within the at least one active area of the screen and not in the at least one inactive area of the screen, wherein the at least one active area of the intermediary mask layer is in registration with the at least active area of the screen to allow display of the at least one digital video file through the intermediary mask layer.

24. A digital display product comprising:
a framed article including:
- a digital display assembly comprising: (a) a screen for displaying a continuously-looping playback of at least one digital video file, and (b) a display controller comprising a printed circuit board having at least one processor and at least one memory that stores the at least one digital video file, wherein the memory is factory programmed and therefore the content of the memory cannot be changed by an end user, the digital display assembly further comprising a first sensor component;
- a frame disposed in relation to the digital display assembly; and
- a power source operatively connected to the display controller; and packaging for initially containing the framed article,
wherein when the framed article is contained within the packaging, the first sensor component is in proximity to the packaging and the display controller is programmed to not play the at least one digital video file, while the display controller and the first sensor component are configured such that spatial separation of the first sensor component relative to the packaging, due to removal of the framed article from the packaging, automatically signals the display controller to initiate the continuously-looping playback of at least one digital video file.

25. The digital display product of claim 24, wherein the packaging includes a second sensor component, wherein when the first and second sensor components are in proximity to one another, the at least one digital video file is not played, while spatial separation of the first sensor component relative to the second sensor component automatically causes the continuously-looping playback of at least one digital video file.

26. The digital display product of claim 25, wherein the first sensor component comprises a magnet sensor and the second sensor component comprises a magnet contained within the packaging.

27. The digital display product of claim 24, wherein the frame comprises:
- a front plate disposed along a front side of the digital display assembly;
- an intermediary mask layer that is patterned to cover at least a portion of the screen, the portion in the range of 0% to 100%; and
- a back plate disposed along a back side of the digital display assembly;
- wherein the intermediary mask layer is disposed against a front surface of the screen and includes at least one active area in which the screen is visible and at least one inactive area that covers and obscures the screen.

28. A framed article comprising:
- a digital display assembly comprising: (a) a screen for displaying a continuously-looping playback of at least one digital video file, (b) a display controller comprising a printed circuit board having at least one processor and at least one memory that contains the at least one digital video file, wherein the memory is factory programmed and therefore the content of the memory cannot be changed by an end user, and (c) a sensor that is operatively connected to the display controller and is configured to trigger the display controller to automatically initiate the continuously looping playback of the at least one digital video file in response to a sensed event that originates external to the framed article, wherein the sensed event is not a user command or input from a user control interface;
- a frame surrounding at least a portion of the digital display assembly; and
- a power source operatively connected to the display controller.

29. The framed article of claim 28, wherein the framed article is free of any user accessible user interface that is configured to control operation and playback of the at least one digital video file.

30. The framed article of claim 28, wherein the sensor is selected from the group consisting of: a magnet sensor, an ambient light sensor, and a motion sensor.

* * * * *